S. Rockafellow,
Harvester Cutter.

No. 334

Reissued. Dec. 11. 1855.

Witnesses:

David Shine

Ben. Morton

Samuel Rockafellow

UNITED STATES PATENT OFFICE.

SAMUEL ROCKAFELLOW, OF COATESVILLE, PENNSYLVANIA.

IMPROVEMENT IN REAPING AND MOWING MACHINES.

Specification forming part of Letters Patent No. 13,181, dated July 3, 1855; Reissue No. 334, dated December 11, 1855.

*To all whom it may concern:*

Be it known that I, SAMUEL ROCKAFELLOW, of Coatesville, in the county of Chester and State of Pennsylvania, have invented a new and Improved Reaping and Mowing Machine; and I do hereby declare that the following is a full, clear, and exact description of the construction and operation of the same, reference being had to the annexed drawings, making a part of this specification, in which—

Figure 4:
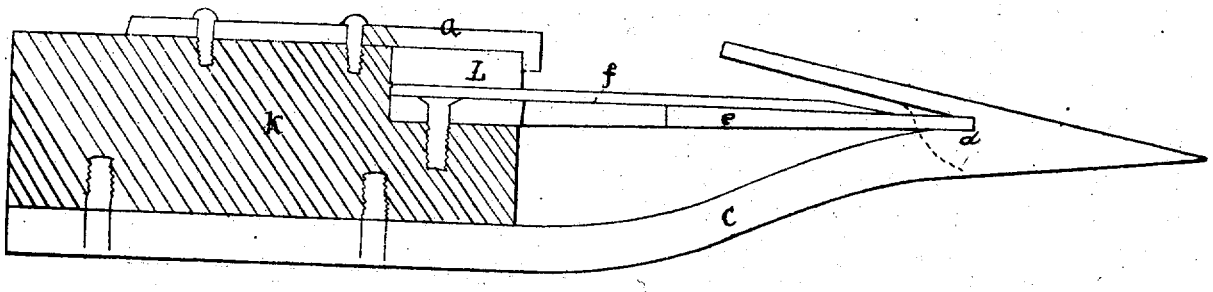

Figure 1 is a side view of my improved machine; Fig. 2, a transverse vertical section of the same, the plane of section being through the center; Fig. 3, a plan or top view of a portion of the finger-bar and cutters; Fig. 4, an enlarged transverse section of the finger-bar, finger, and cutters; and Fig. 5, a plan view of the same, like letters indicating the same parts when in the different figures.

The nature of my invention consists in the peculiar means employed, which will be hereinafter described, for elevating and depressing the finger-bar and sickle, and in the peculiar mode in which I construct and apply the fingers for the purpose of supporting the ends of the stationary knives or cutters and preventing the cutters from becoming choked.

To enable others skilled in the art to fully understand and construct my invention, I will proceed to describe it.

A represents the frame of the machine, composed of two side pieces, *a a*, and suitable connections to support the gearing by which the sickle is driven.

B represents the driving-wheel, having a gear-wheel, C, attached to its inner side. The driving and gear wheels are hung upon an axle, *b*, which has its bearings in the frame A. (See Fig. 2.) The gear-wheel C gears into a pinion, D, on a shaft, E, which works in suitable bearings on the upper part of the frame A. This shaft E has also a toothed wheel, F, upon it, which gears into a pinion, G, hung upon a vertical shaft, H. At the lower end of the shaft H there is a crank-pulley, I, to which one end of a pitman or connecting rod, J, is attached.

Figure 5:
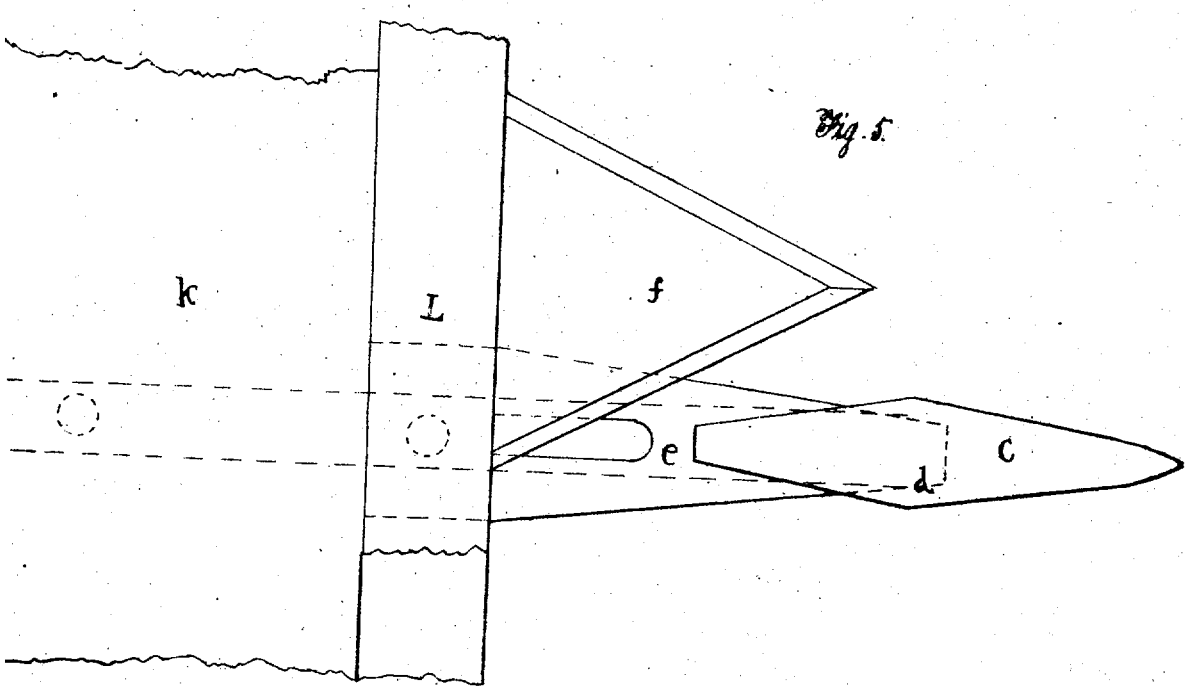

K represents the finger-bar attached to one side of the frame A at its lower part. To the lower part or edge of said finger-bar fingers *c* are attached in a substantial manner, the outer ends of the fingers being provided with knobs or projections *d* and sockets within the same, as shown in Figs. 4 and 5. To the front side of the finger-bar K stationary cutters *e* are attached, the outer ends or points of the cutters being secured in the sockets within the knobs or projections *d*, and the fingers formed or bent upward, so as to serve also as braces or firm and unyielding supports to the ends of the stationary cutters, as shown in Figs. 4 and 5.

L represents the sickle-bar, to which the cutters or teeth *f* are attached in the usual manner. These cutters or teeth *f*, as well as the cutters *e*, are of the usual saw-tooth or triangular form, and have cutting-edges at each side. The cutters or teeth *f* work directly over and in contact with the stationary cutters *e*. The sickle-bar works in guides *a'*, one or more, attached to the upper surface of the finger-bar. The pitman or connecting rod J is attached to one end of the sickle-bar L, as shown in Fig. 2. M M are two vertical bars, the upper ends of which are connected by a cross-bar, N. These bars M M work loosely in the inner side piece, *a*, of the frame A, and have each a small wheel, O, at their lower ends. To the center of the cross-bar N there is attached an arm, P, projecting downward in the side piece, *a*, and to the lower end of this arm the outer end of a lever, Q, is attached by a pin or pivot, *g*. (See Fig. 2, and dotted lines in Fig. 1.) The opposite end of the lever Q is attached to a shaft, R, on the frame A, said shaft having an upright arm, S, attached to it. T, Fig. 1, represents the tongue attached to the front end of the frame A.

As the machine is drawn along the wheel B, in consequence of the gear-wheels C F, pinions P G, crank-pulley I, and pitman or connecting rod J, communicates a reciprocating motion to the sickle-bar L, and its cutters or teeth *f* work over and in contact with the stationary cutters *e*, and the grass or grain is cut between them on both sides of the cutters. The finger-bar and cutters are raised or depressed, so as to cut the grain or grass the required distance from the surface of the ground. By operating the lever or arm S the lever Q, of course, will raise or depress the inner side piece, *a*, and also the finger-bar K and cutters attached to it.

The arm S may be secured at any desired point by a pawl, U, the lower end of which bears upon curved or segment guides V V on the frame A.

The above invention is extremely simple, and the cutters may be elevated and depressed so as to cut the grain or grass the required distance from the ground with the greatest facility. The stationary cutters having their ends fitting firmly in the sockets made in the knobs or projections *d*, and the fingers being constructed so as to form an unyielding support thereto, as fully shown in Figs. 4 and 5, and both sets of cutters *e* and F having sharp cutting-edges on both their outer edges and arranged and operating together, as described, the cutters are prevented from clogging or becoming choked, because the stationary cutters are prevented from being drawn downward by the grain or grass which comes in uncut contact therewith, and consequently the edges of the two sets of cutters are never separated from this cause, and the grass or straw can never get between their two rubbing-surfaces, or the cutters become choked or clogged thereby, as in other machines not provided with a sufficient support to the lower cutters to prevent their being drawn downward or separated from the upper cutters by the tractile action of the grain or grass yet fast to the ground.

What I claim as new, and desire to secure by Letters Patent, is—

1. Raising and depressing the finger-bar K, and consequently the cutters *e f*, by means of the vertical bars M M, having wheels O O at their lower ends, arm P, attached to the cross-piece N of the bars M M, lever Q, and shaft R, with its arm S attached, the above parts being arranged substantially as herein shown and described.

2. Supporting the ends of the stationary cutters *e* by means of the sockets, or their equivalents, in the knobs or projections *d* of the fingers *c*, substantially and for the purpose as set forth and described.

SAMUEL ROCKAFELLOW.

Witnesses:

DAVID SHINE,

BEN. MORISON.